(12) United States Patent
Abe

(10) Patent No.: US 9,395,169 B2
(45) Date of Patent: Jul. 19, 2016

(54) MULTI-AXIS TYPE THREE-DIMENSIONAL MEASURING APPARATUS

(71) Applicant: MITUTOYO CORPORATION, Kawasaki-shi, Kanagawa (JP)

(72) Inventor: Shinsaku Abe, Sapporo (JP)

(73) Assignee: MITUTOYO CORPORATION, Kawasaki (JP)

( * ) Notice: Subject to any disclaimer, the term of this patent is extended or adjusted under 35 U.S.C. 154(b) by 86 days.

(21) Appl. No.: 14/563,205

(22) Filed: Dec. 8, 2014

(65) Prior Publication Data

US 2015/0159987 A1 Jun. 11, 2015

(30) Foreign Application Priority Data

Dec. 10, 2013 (JP) ................................ 2013-255399

(51) Int. Cl.
*G01B 5/008* (2006.01)
*G01B 21/04* (2006.01)

(52) U.S. Cl.
CPC .............. *G01B 5/008* (2013.01); *G01B 21/047* (2013.01)

(58) Field of Classification Search
CPC ................................ G01B 5/008; G01B 21/047
USPC .......................................................... 33/503
See application file for complete search history.

(56) References Cited

U.S. PATENT DOCUMENTS

| | | | | |
|---|---|---|---|---|
| 8,874,406 B2* | 10/2014 | Rotvold | ............... | G01B 11/002 33/503 |
| 2008/0316501 A1* | 12/2008 | Hirata | ................... | G01B 11/24 356/601 |
| 2009/0217426 A1* | 8/2009 | Noda | ..................... | G01B 3/008 850/21 |
| 2011/0178764 A1* | 7/2011 | York | ....................... | G01B 5/008 702/152 |
| 2013/0176575 A1* | 7/2013 | Hidaka | .............. | G01B 9/02041 356/508 |
| 2014/0190027 A1* | 7/2014 | Abe | ........................ | G01B 5/008 33/503 |
| 2014/0190028 A1* | 7/2014 | Abe | ........................ | G01B 5/008 33/503 |
| 2015/0226543 A1* | 8/2015 | Nemoto | ............... | G01B 11/026 356/612 |
| 2015/0345932 A1* | 12/2015 | Wakai | .................. | G01B 11/007 33/503 |
| 2015/0377606 A1* | 12/2015 | Thielemans | ......... | G01B 21/047 356/625 |
| 2016/0055267 A1* | 2/2016 | Tomono | .............. | G06F 17/5086 703/1 |
| 2016/0097629 A1* | 4/2016 | York | ...................... | G01B 7/008 33/503 |

FOREIGN PATENT DOCUMENTS

JP A-2007-47014 2/2007

\* cited by examiner

*Primary Examiner* — G. Bradley Bennett
(74) *Attorney, Agent, or Firm* — Oliff PLC

(57) ABSTRACT

A multi-axis type three-dimensional measuring apparatus includes a multi-axis arm mechanism, a probe formed in a distal end of the multi-axis arm mechanism and configured to measure a workpiece, and a projector formed in the distal end of the multi-axis arm mechanism and configured to scale a range of a projected projection image according to a distance between the workpiece and the probe. The projector is configured to project full-scale projection graphics of said workpiece so as to match the full-scale projection graphics with the workpiece regardless of a difference in a distance between the workpiece and the probe, and to project display information identifying a measurement schedule position by the probe.

16 Claims, 10 Drawing Sheets

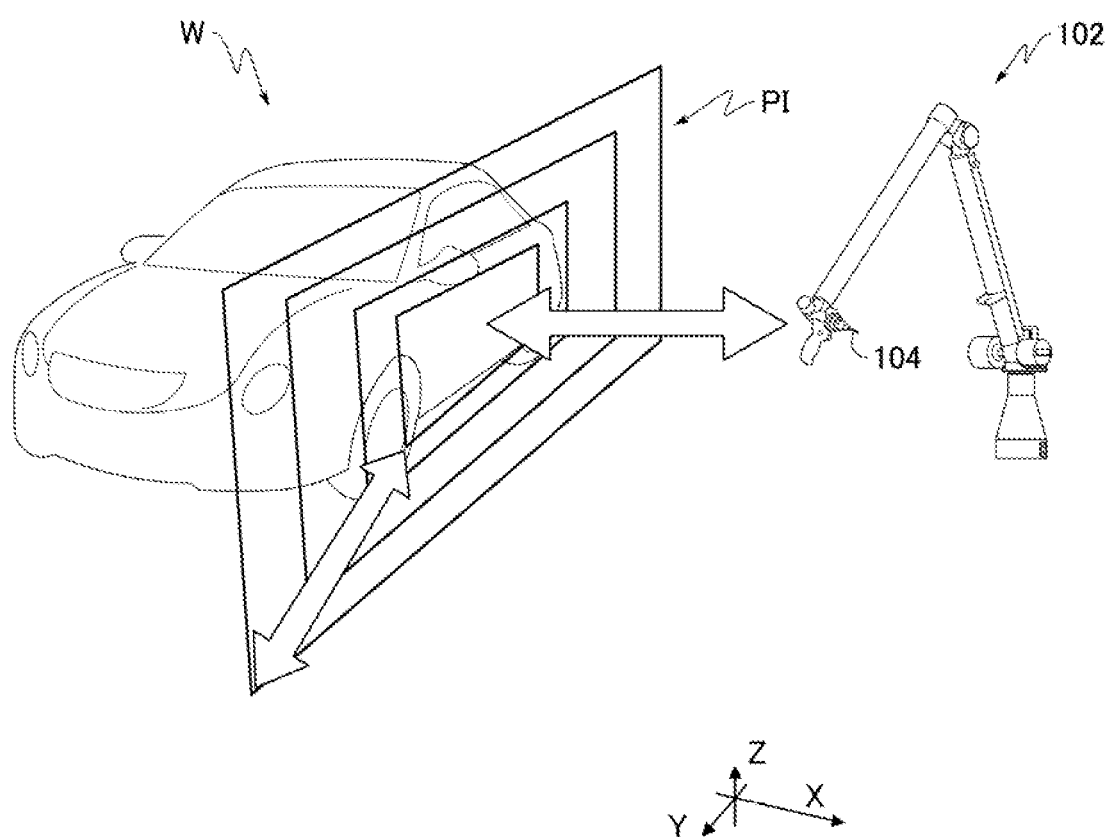

MULTI-AXIS TYPE THREE-DIMENSIONAL MEASURING APPARATUS

CROSS-REFERENCE TO RELATED APPLICATION

The present application claims priority to Japanese Patent Application No. 2013-255399 filed on Dec. 10, 2013, the entire content of which is incorporated herein by reference.

BACKGROUND

1. Technical Field

The present invention relates to a multi-axis type three-dimensional measuring apparatus, and particularly to a multi-axis type three-dimensional measuring apparatus capable of making highly-efficient and accurate measurement by being constructed so that a measurer can check information to be checked for measurement without removing a gaze from workpiece.

2. Related Art

Patent Reference 1 discloses a multi-axis type three-dimensional measuring apparatus. This multi-axis type three-dimensional measuring apparatus has a probe for measuring workpiece, and a multi-axis arm mechanism including the probe in the distal end. In this multi-axis type three-dimensional measuring apparatus, a position (measurement schedule position) of workpiece at which measurement will be made is displayed on a display module (display) of a notebook personal computer or a desktop personal computer (computer) connected thereto, and its measurement schedule position is measured by the probe in a contact or non-contact manner while referring to design information etc. In other words, this multi-axis type three-dimensional measuring apparatus is constructed so that a measurer checks the measurement schedule position etc. of the workpiece to be measured on the display module of the personal computer and makes measurement while collating the position with the actual workpiece.

PRIOR ART REFERENCE

Patent Reference

[Patent Reference 1] JP-A-2007-47014

In other words, in the multi-axis type three-dimensional measuring apparatus as shown in Patent Reference 1, it is necessary for the measurer to repeat operation of alternately looking at the workpiece and the display module of the personal computer every measurement. That is, since the measurer removes a gaze from the workpiece every measurement, it is difficult to maintain high measurement efficiency and there is fear of triggering, for example, a mistake of measurement. Particularly, for a low-skilled measurer, efficient measurement cannot be made and measurement efficiency or measurement accuracy may decrease remarkably.

In addition, a technique for miniaturizing a display module and arranging the display module in the vicinity of a measurer and preventing a gaze of the measurer from being removed from workpiece is contemplated. However, even in this case, the operation of alternately looking at the display module and the workpiece remains repeated, and the size of display of the display module also decreases visibility and probably, the technique does not reach the solution of the problem described above.

SUMMARY

Exemplary embodiments of the invention provide a multi-axis type three-dimensional measuring apparatus in which highly-efficient and accurate measurement can be made by being constructed so that a measurer can check information to be checked for measurement without removing a gaze from workpiece.

A multi-axis type three-dimensional measuring apparatus according to an exemplary embodiment, comprises:

a multi-axis arm mechanism;

a probe formed in a distal end of the multi-axis arm mechanism and configured to measure a workpiece; and a projector formed in the distal end of the multi-axis arm mechanism and configured to scale a range of a projected projection image according to a distance between the workpiece and the probe, wherein the projector is configured to project full-scale projection graphics of said workpiece so as to match the full-scale projection graphics with the workpiece regardless of a difference in a distance between the workpiece and the probe, and to project display information identifying a measurement schedule position by the probe.

A projection direction of the projection image may be set in the same direction as a direction of a distal end of the probe.

The display information may be configured to vary before and after measurement of the workpiece.

The display information may further include information about a measured position by the probe.

The display information may further include a design value of the measurement schedule position and a measured value of a measured position by the probe.

The display information may further include measurement profile information about a measurement procedure, a measurement instruction and a measurement technique in the case of measuring workpiece with the same shape as that of the workpiece.

According to the invention, highly-efficient and accurate measurement can be made by being constructed so that a measurer can check information to be checked for measurement without removing a gaze from workpiece.

BRIEF DESCRIPTION OF THE DRAWINGS

FIG. 3 is a schematic diagram showing a relation among workpiece, the multi-axis type three-dimensional measuring machine and a range of a projection image.

DETAILED DESCRIPTION

One example of embodiments of the invention will hereinafter be described in detail with reference to the drawings.

A first embodiment according to the invention will be described using FIGS. 1 to 11.

First, a configuration of a multi-axis type three-dimensional measuring apparatus 100 according to the present embodiment is described.

Figure 1:
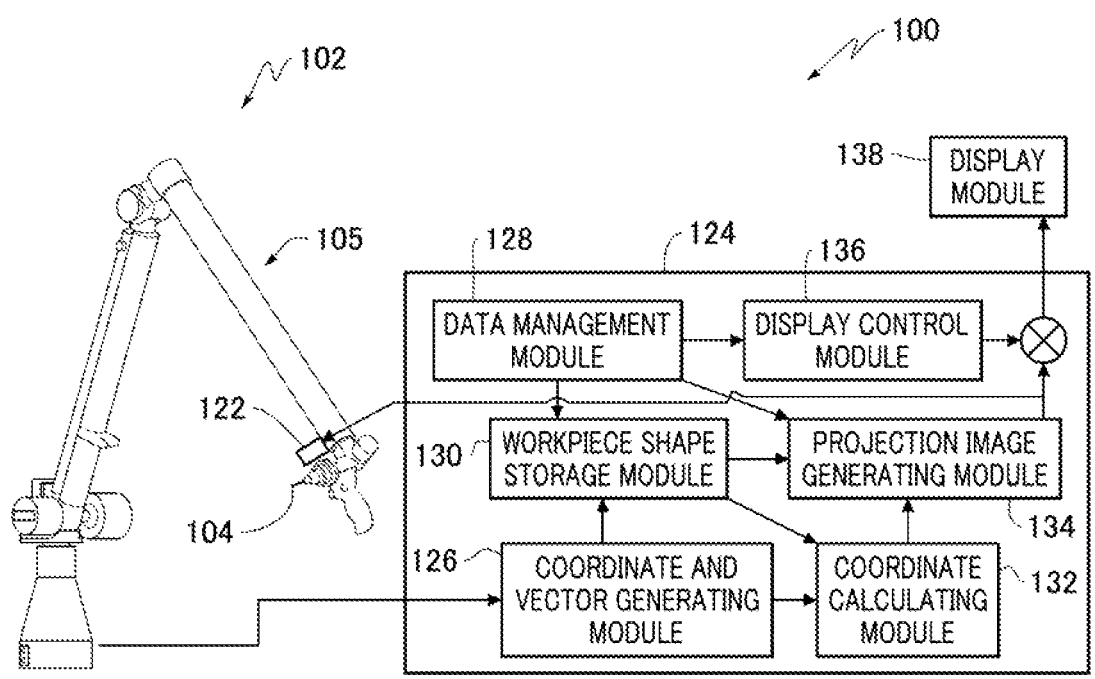
FIG. 1 is a schematic diagram showing one example of a multi-axis type three-dimensional measuring apparatus according to a first embodiment of the invention.

The multi-axis type three-dimensional measuring apparatus 100 has a multi-axis type three-dimensional measuring machine 102, a processing module 124 and a display module 138 as shown in FIG. 1. Also, when a three-dimensional shape of workpiece W (not shown) is measured by the multi-axis type three-dimensional measuring apparatus 100, a measurer grasps and operates a grip 119 formed on an arm head 118 shown in FIG. 2A and manually moves a probe 104. That is, the multi-axis type three-dimensional measuring apparatus 100 has a passive configuration in which a driving source is not provided in a shaft of a multi-axis arm mechanism 105. Then, the measurer can bring the probe 104 near to the workpiece W from any direction freely and bring the probe 104 into contact with the workpiece W at any angle freely. Then, the measurer can switch an on-off state of measurement of the workpiece W by operation of a switch (not shown).

Figure 2A:
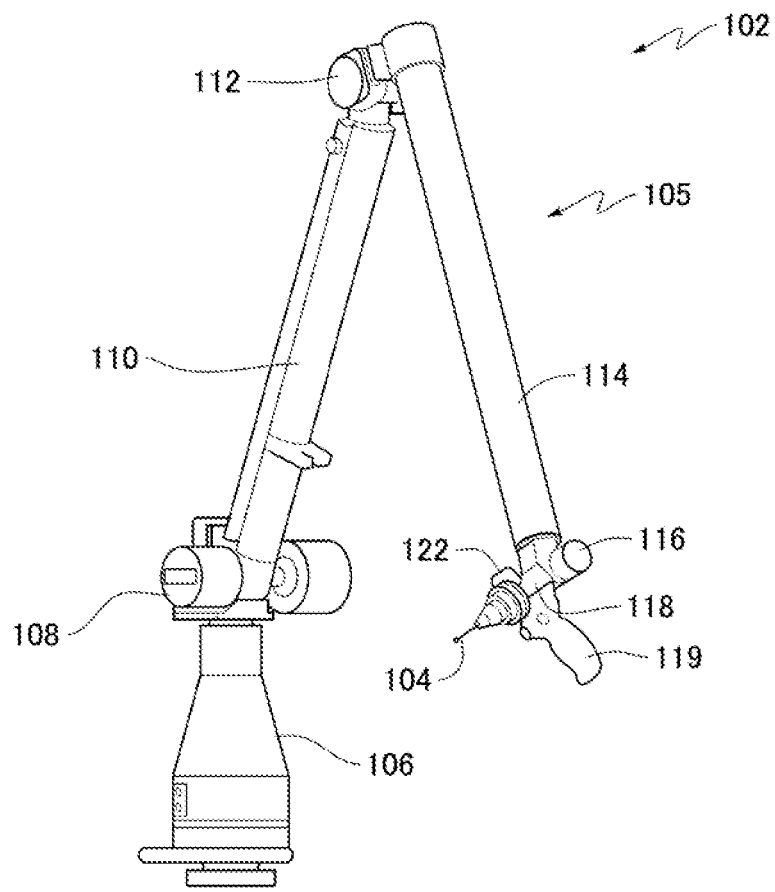
FIG. 2A is a schematic diagram showing one example of a multi-axis type three-dimensional measuring machine of FIG. 1.

The multi-axis type three-dimensional measuring machine 102 has the probe 104 and the multi-axis arm mechanism 105 as shown in FIG. 2A. The probe 104 is means for measuring the workpiece W (not shown), and the tip (probe tip) 104A of the probe 104 has a ball shape. As shown in FIG. 2A, in the multi-axis arm mechanism 105, a base part 106 supports a first arm 110 through a first joint 108, and the first arm 110 supports a second arm 114 through a second joint 112, and the second arm 114 supports the arm head 118 through a third joint 116. The arm head 118 is formed in the distal end of the multi-axis arm mechanism 105 and includes the probe 104. The first joint 108 (the second joint 112 and the third joint 116) are respectively formed rotatably in axial directions orthogonal mutually, and two rotary type encoders (not shown) capable of detecting a rotational angle are built into the joint. In other words, the shaft of the multi-axis arm mechanism 105 of the embodiment is set at six shafts (the shaft of the multi-axis aim mechanism 105 is not limited to the six shafts and may be seven shafts etc.). A position (coordinate) of the probe 104 can be identified based on outputs of all of these encoders. The base part 106 may be directly arranged on a workpiece table etc. on which the workpiece W (not shown) is placed, or may be arranged on the workpiece table etc. through a tripod table.

Figure 2B:
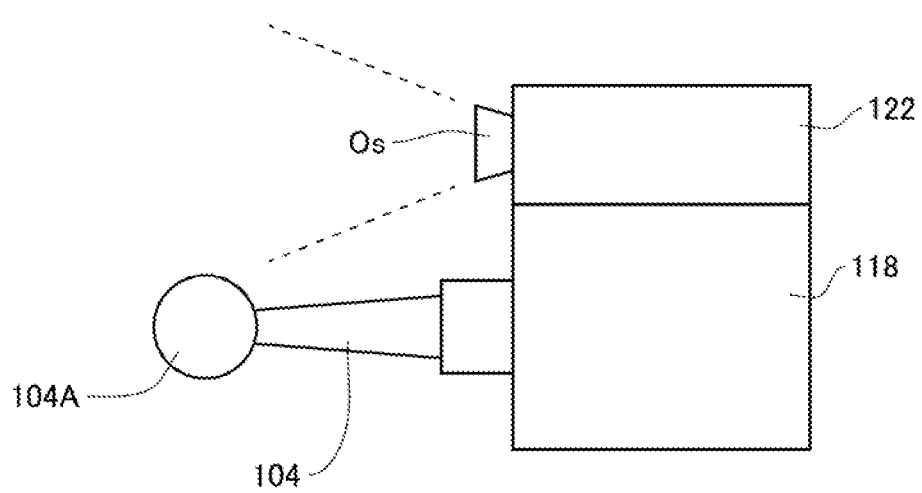
FIG. 2B is an arrangement diagram of a probe and a projector with respect to an arm head of the multi-axis type three-dimensional measuring machine of FIG. 1.

In addition, the arm head 118 is provided with a projector 122 together with the probe 104 as shown in FIGS. 1, 2A and 2B. In the embodiment, the probe 104 is arranged in the distal end of the arm head 118, and the projector 122 is arranged integrally to an upper portion of the arm head 118. The projector 122 includes an optical system Os in the front as shown in FIG. 2B. In other words, a projection direction of a projection image PI by the projector 122 is set in the same direction as a direction of the distal end of the probe 104 as shown in FIG. 2B. The projector 122 is configured to scale a range of the projected projection image PI according to a distance between the probe 104 and the workpiece W being a projection destination as shown in FIG. 3 (In FIG. 3, a smaller solid line frame shows the range of the projection image PI at the time when the probe 104 moves nearer to the workpiece W, that is, a screen size. In addition, an outline type arrow in a right-and-left direction shows the distance between the workpiece W and the probe 104, and an outline type arrow in an oblique direction shows scaling of the range of the projection image PI.).

The processing module 124 is connected to the multi-axis type three-dimensional measuring machine 102, the projector 122 and the display module 138 as shown in FIG. 1. The processing module 124 includes a coordinate and vector generating module 126, a data management module 128, a workpiece shape storage module 130, a coordinate calculating module 132, a projection image generating module 134, and a display control module 136. The processing module 124 may be built into the multi-axis arm mechanism 105 or may be included in a personal computer connected to the outside of the multi-axis arm mechanism 105.

The coordinate and vector generating module 126 generates a position (coordinate) (of a probe tip 104A) of the probe 104 from an output (output of an encoder) of the multi-axis type three-dimensional measuring machine 102. At the same time, a directional vector (a direction in which the probe 104 is turned) (of the probe tip 104A) of the probe 104 is generated (when an output of the multi-axis type three-dimensional measuring machine 102 outputs a position of the probe 104, the coordinate and vector generating module 126 outputs its output as it is).

The data management module 128 processes a command from an input module (not shown), and gives the workpiece shape storage module 130, the projection image generating module 134 and the display control module 136 various instructions such as the presence or absence of projection graphics of the workpiece W by the projector 122 and its color specification, the presence or absence of information about a measured position and information about a measurement schedule position and its display method according to its command. Also, the data management module 128 may be constructed so as to give instructions on a measurement condition etc. by the probe 104 and synthesize its measurement condition to the projection image PI in that case.

The workpiece shape storage module 130 stores design information DI such as a design shape or the design value itself of the workpiece W targeted for measurement obtained from three-dimensional CAD data etc. In addition, in the workpiece shape storage module 130, the design information DI is information on a coordinate system (workpiece coordinate system) in the case of making measurement by the probe 104 (that is, in the design information DI about the workpiece W stored in the workpiece shape storage module 130, plural characteristic coordinates of the workpiece W are previously measured by the probe 104 and are calibrated to the information on the workpiece coordinate system). Also, for example, information about a measured position including measured value information about the workpiece W outputted from the coordinate and vector generating module 126 is stored in the workpiece shape storage module 130. In addition, the data management module 128 identifies, for example, a design value, a measurement schedule position or projection graphics of the workpiece W from among the design information DI about the workpiece W.

The coordinate calculating module 132 calculates a range (screen size) of the projection image PI according to a distance to the workpiece W by the workpiece shape storage module 130 based on a position of the probe 104 generated by the coordinate and vector generating module 126. Also, the coordinate calculating module 132 calculates a coordinate (screen coordinate) for defining a directional position in which the projection image PI is projected based on a directional vector of the probe 104 generated by the coordinate and vector generating module 126.

The projection image generating module 134 generates the projection image PI instructed by the data management module 128 based on information from the workpiece shape storage module 130. In other words, display information (information about a measurement schedule position and information about a measured position) and a design shape of the workpiece W are synthesized to the projection image PI. In the design shape of the workpiece W, projection can be made so as to match (fit) with the workpiece W as full-scale projection graphics of the workpiece W regardless of a difference in a distance between the workpiece W and the probe 104. The information about the measurement schedule position includes information for identifying the measurement schedule position, and its design value information. Also, the information about the measured position includes information for identifying the measured position, and its measured value information (measurement result). As a result, together with the full-scale projection graphics of the workpiece W, the display information is projected on the workpiece W as the projection image PI from the projector 122. In addition, the display information is properly scaled and displayed using a position of the probe 104 as a criterion, that is, in the size in which a measurer can easily perform visual recognition from the position of the probe 104.

On the other hand, according to a command from the data management module 128, the contents of display created by the display control module 136 for controlling the display module 138 are synthesized to the generated projection image PI and are displayed on the display module 138. In addition, in the embodiment, the display module 138 is used for checking a design value and a measured value and performing the post-processing after the completion of measurement.

A concrete relation between the workpiece W and the projection image PI will hereinafter be described using FIGS. 4 to 10.

Figure 4:
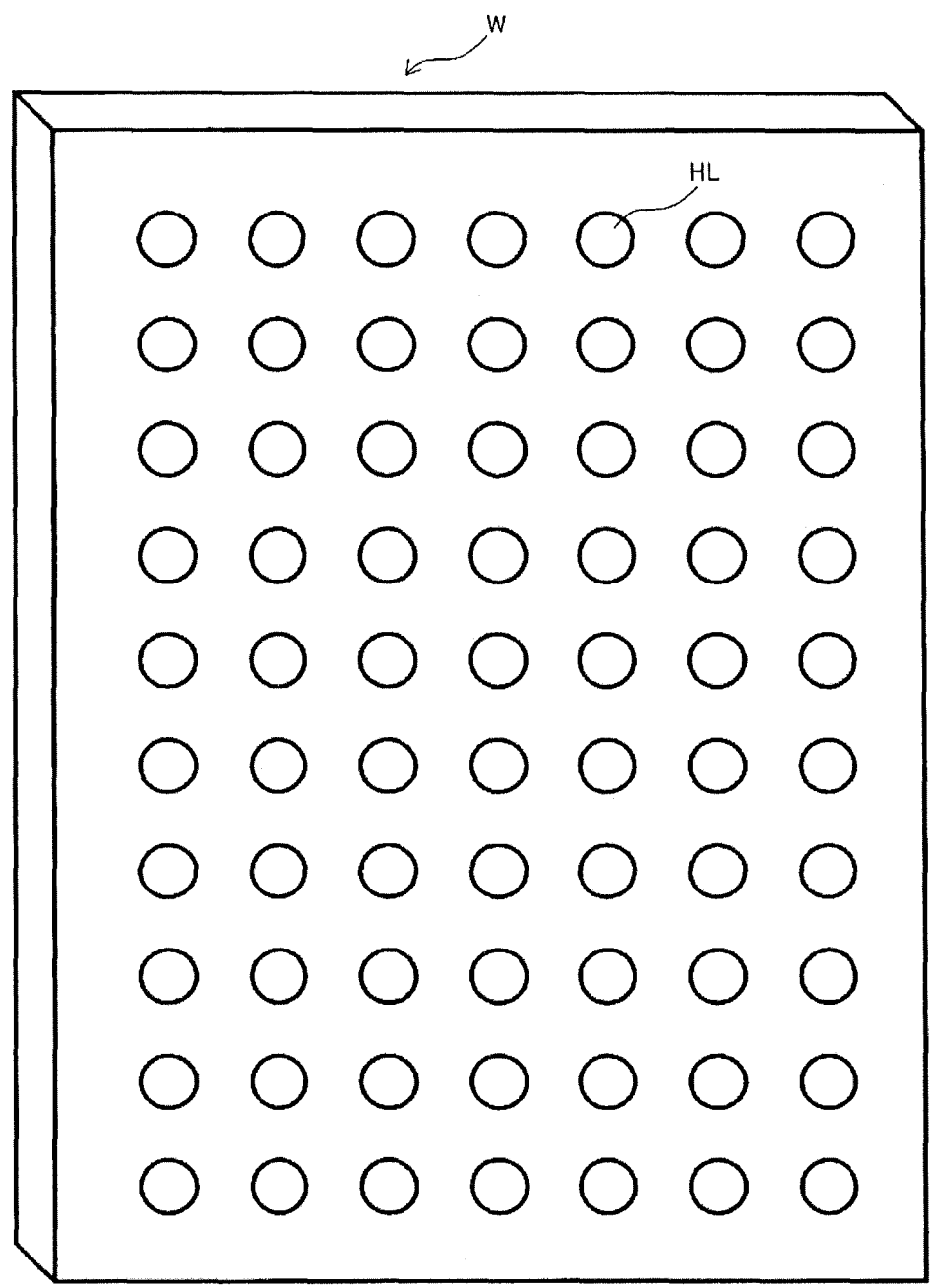
FIG. 4 is a schematic diagram showing one example of another workpiece.
Figure 5:
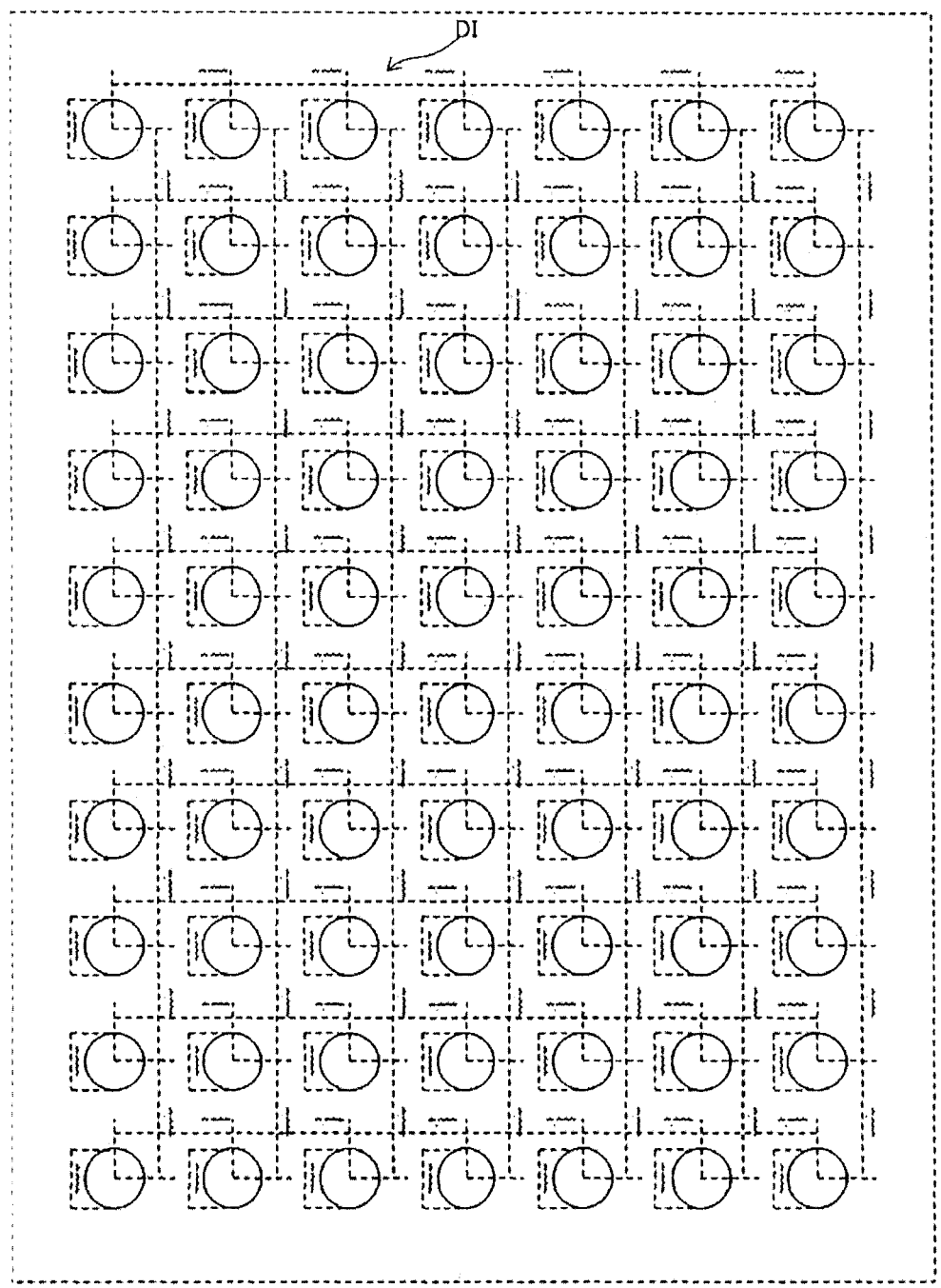
FIG. 5 is a schematic diagram showing one example of design information about the workpiece of FIG. 4.
Figure 6:
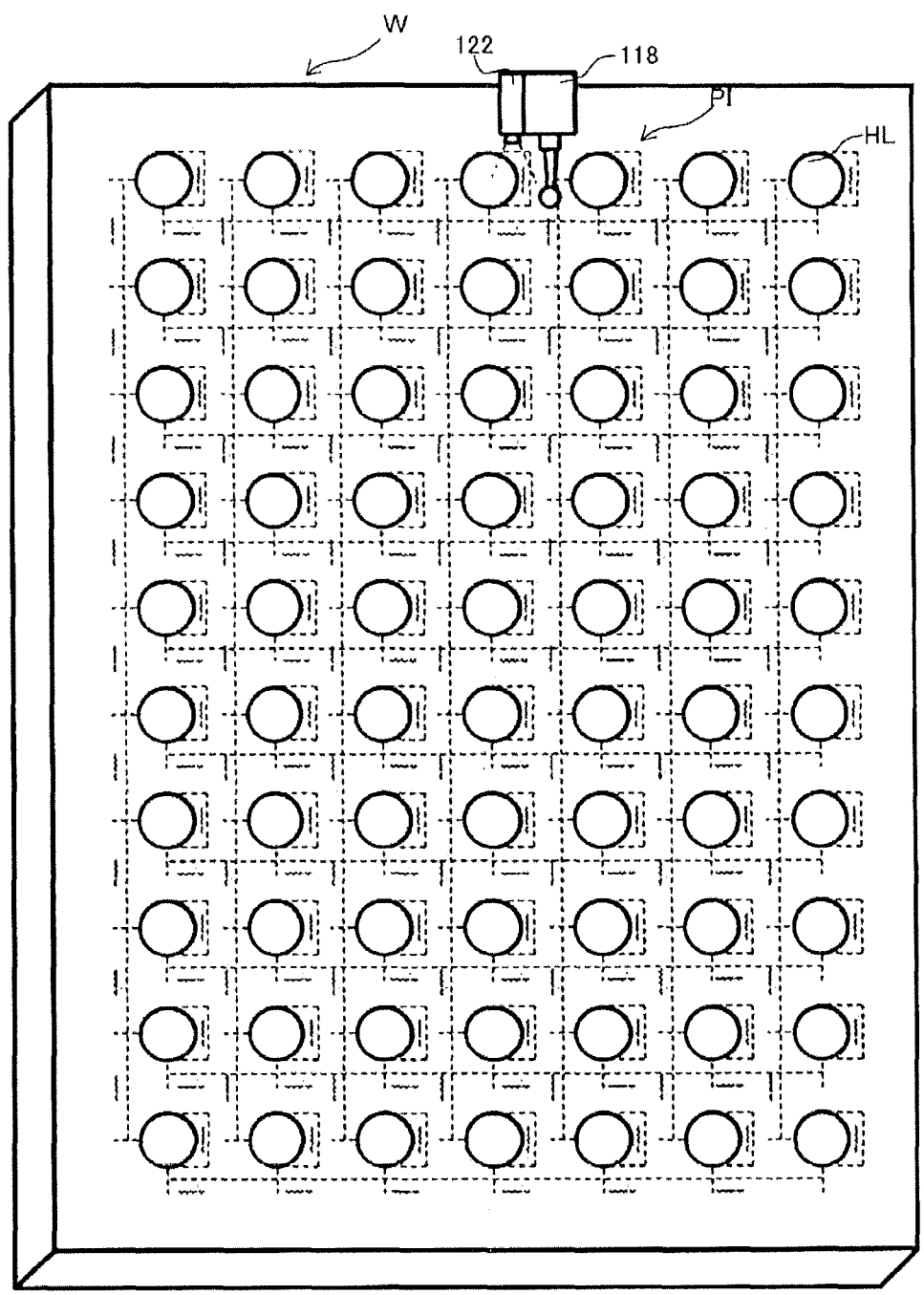
FIG. 6 is a schematic diagram showing one example of a state in which the design information of FIG. 5 is projected on the workpiece of FIG. 4.
Figure 7:
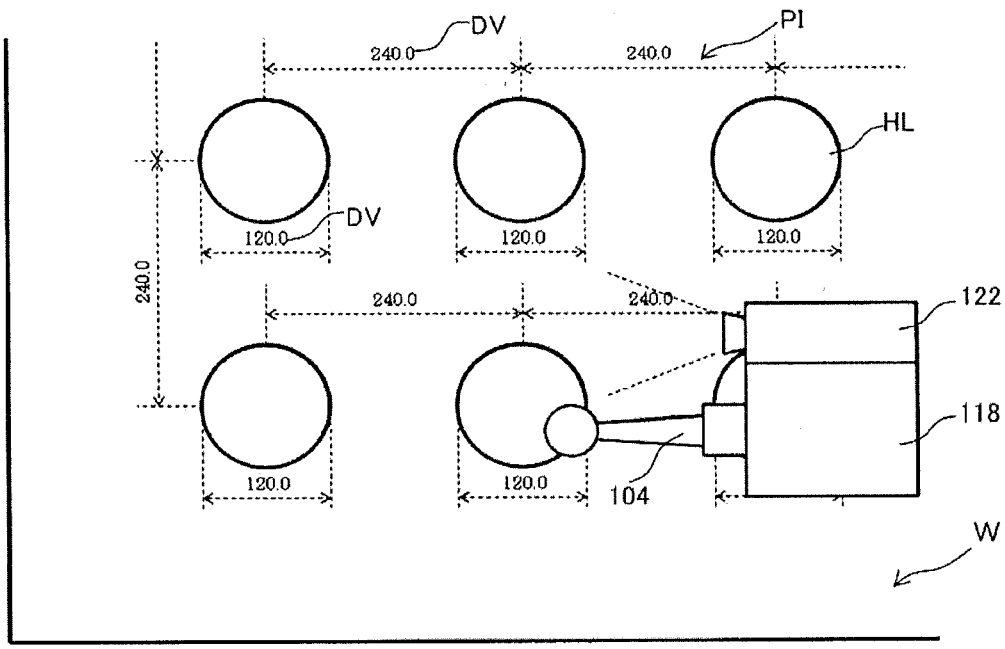
FIG. 7 is a schematic diagram showing one example of a local part of FIG. 6.

First, it is assumed that the workpiece W is a plate with equally-spaced opened holes HL as shown in FIG. 4. In that case, the design information DI about the workpiece W is shown in, for example, FIG. 5. A design value of a measurement schedule position together with a design shape is described in the design information DI. When a directional vector of the probe 104 matches with a direction of the workpiece W and the design information DI is projected on the workpiece W as the projection image PI, the design information DI is shown in FIGS. 6 and 7. That is, when the probe 104 is separate from the workpiece W correspondingly to the extent to which the range of projection graphics of the workpiece W covers the whole workpiece W, the design information DI about the workpiece W is projected on the whole workpiece W as the projection image PI as shown in FIG. 6. Also, when the probe 104 is near to the workpiece W to the extent to which the range of projection graphics of the workpiece W covers a part of the workpiece W, the design information DI about the workpiece W is projected on only a part of the workpiece W near to the probe 104 as the projection image PI as shown in FIG. 7. In both cases, it is constructed so that the holes HL on the workpiece W match with design holes (in other words, the projector 122 projects full-scale projection graphics of the workpiece W so as to match the full-scale projection graphics with the workpiece W regardless of a difference in a distance between the workpiece W and the probe 104). In other words, when the probe 104 is separate from the workpiece W, a measurer can check the design information DI about the whole workpiece W, and when the probe 104 is near to the workpiece W, the measurer can check the design information DI about a part of the workpiece W required. Then, when the probe 104 is near to the workpiece W, design values DV such as a diameter of the hole HL or a spacing between the holes HL can surely be checked as shown in FIG. 7.

Figure 8:
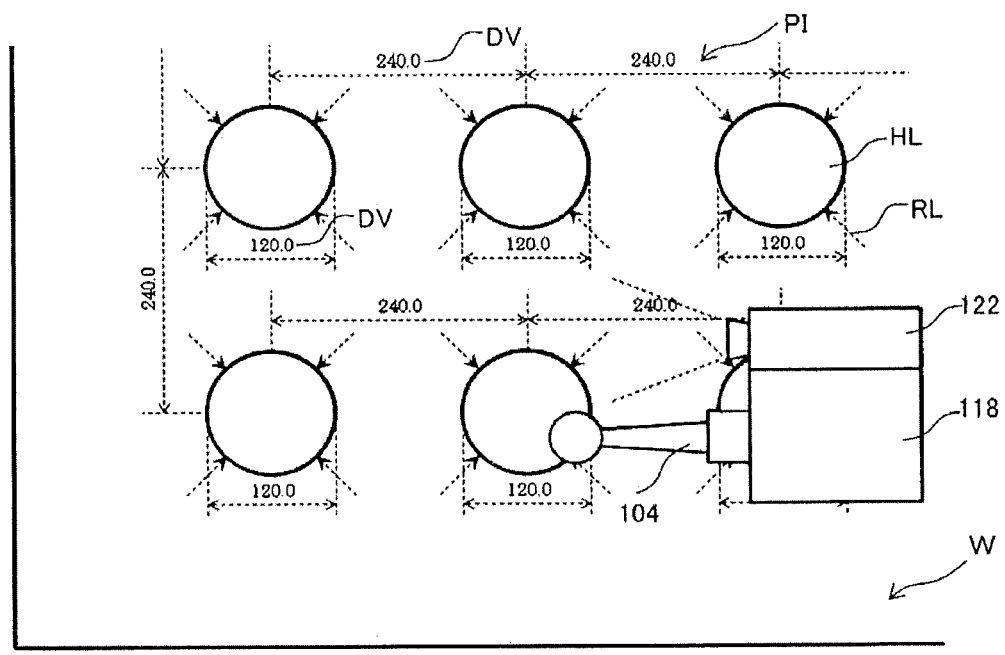
FIG. 8 is a schematic diagram showing one example of display information for identifying a measurement schedule position in FIG. 7.
Figure 9:
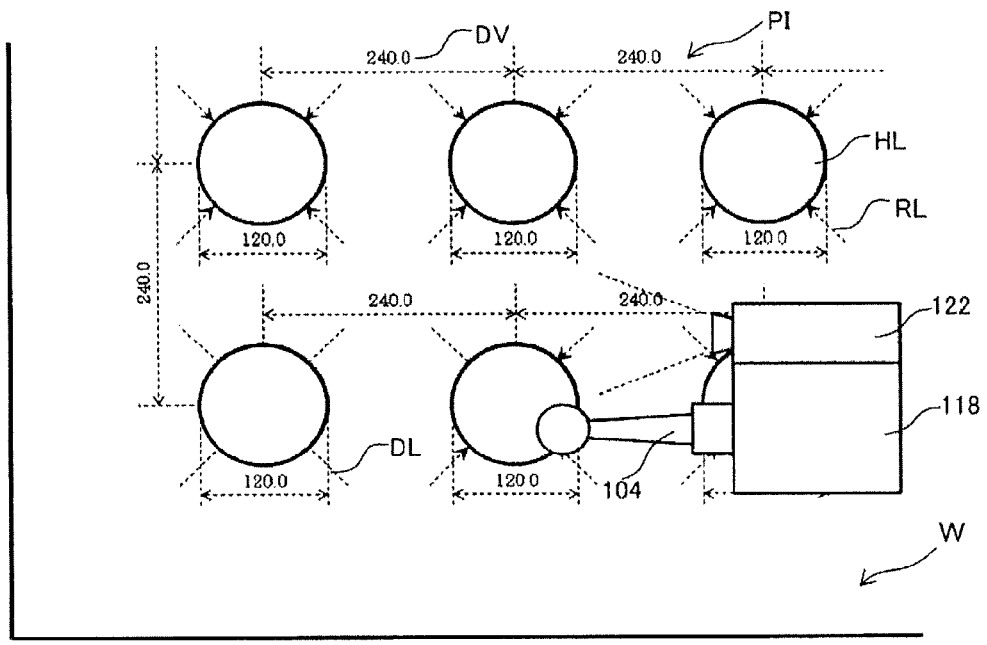
FIG. 9 is a schematic diagram showing one example of display information for identifying a measured position from a state of FIG. 7.

At this time, the measurement schedule position can easily be identified by dashed arrows RL as shown in FIG. 8. In other words, the dashed arrows RL indicate display information for identifying the measurement schedule position. Then, when measurement by the probe 104 is completed with respect to the measurement schedule position, its measurement schedule position becomes a measured position to be changed from the dashed arrows RL to dashed lines DL as shown in FIG. 9. In other words, the display information is configured to vary before and after measurement of the workpiece. Then, the dashed lines DL indicate display information for identifying the measured position. Or, a projection image PI in another workpiece W shown in FIG. 10 may be configured to identify a measurement schedule position by dashed arrows RL and display a measured position after measurement by dashed circles DP.

Figure 11:
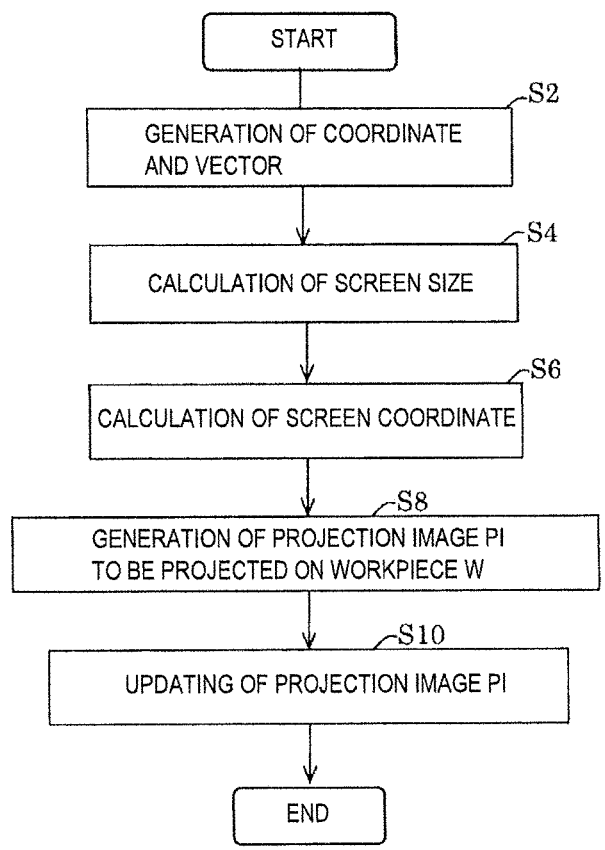
FIG. 11 is a flowchart showing one example of a display procedure of a projection image.

Next, one example of a display procedure of the projection image PI in the multi-axis type three-dimensional measuring apparatus 100 of the embodiment will hereinafter be described using FIG. 11.

First, the processing module 124 generates coordinates of the probe 104 based on an output of the multi-axis type three-dimensional measuring machine 102. At the same time, a directional vector of the probe 104 is generated (step S2). Next, the processing module 124 calculates a screen size based on a distance from the coordinates of the probe 104 to workpiece W (step S4). Then, the processing module 124 calculates screen coordinates from the generated directional vector (step S6). Then, the processing module 124 generates a projection image PI in which display information and projection graphics to be projected on the workpiece W are synthesized (step S8). Then, the processing module 124 projects the generated projection image PI from the projector 122 and updates the projection image PI (step S10).

In the related art, in the case of checking a measurement result of workpiece W during measurement, an operator must once lose hold of a measuring machine and move to a place of a personal computer and then rotate and scale the measurement result displayed on a display module by operating a mouse etc. of the personal computer and check the measurement result. Also, it is necessary for the operator to check a CAD drawing on paper or three-dimensional CAD data displayed on the display module and collate the CAD drawing or the CAD data with the actual workpiece W and temporarily remember a necessary design value. Further, for large workpiece W, the display module cannot be visually recognized directly by hiding the display module of the personal computer in a shadow of the workpiece W, or the contents of display cannot be checked due to the far display module, or the display module may be arranged in the outside of the workpiece W in the case of being moved inside the workpiece W to make measurement, with the result that the operator must change a position of the display module in each case.

On the other hand, in the embodiment, the projector 122 included in the arm head 118 can project full-scale projection graphics of the workpiece W so as to match (fit) the full-scale projection graphics with the workpiece W regardless of a difference in a distance between the workpiece W and the probe 104, and also projects display information for identifying a measurement schedule position by the probe 104. Then, a projection direction of the projection image PI is set in the same direction as a direction of the distal end of the probe 104. That is, as long as the workpiece W is present in the direction (direction shown by the directional vector) of the distal end of the probe 104, the display information for identifying the measurement schedule position by the probe 104 is always displayed on the workpiece W from the projector 122 regardless of the difference in the distance between the workpiece W and the probe 104. In other words, even for the large workpiece W, it is unnecessary to move the display module 138, and the need for a check on the display module 138 during measurement can be eliminated by checking the display information projected on the workpiece W from the projector 122.

Concretely, in the embodiment, when the probe 104 is far separate from the workpiece W, the display information is projected on the whole workpiece W so as to fit with the whole workpiece W. As a result, it becomes easy to grasp a range of a measured position or a measurement schedule position used as the next measurement position. When the probe 104 is moved near to the measurement schedule position of the workpiece W, a range of the projection image PI is narrowed continuously with no interruption and a range of the projected display information is also changed to only the vicinity of its measurement schedule position and more detailed measurement information can be checked. This can be implemented by calibrating a region (range) or a size of the display information projected according to a position or a distance between the probe 104 and the workpiece W. As a result, without checking the display module 138 each time, movement switching of the display information according to the distance can be performed and the workpiece W can be measured efficiently and speedily from the display information projected on the workpiece W. That is, a measurer can easily understand the measurement schedule position by the probe 104 regardless of a difference in the distance between the workpiece W and the probe 104 without looking at the display module 138.

Also, in the embodiment, when the probe 104 is moved to right and left with respect to the workpiece W from a state near to the workpiece W, screen coordinates are obtained from a directional vector, and therefore corresponding design data is automatically (continuously) switched and projected on the workpiece W of the range to be projected from a position of a movement destination of the probe 104 without requiring special operation. In other words, a design value of a desired check portion of the workpiece W can be displayed on the workpiece W by only adjusting a direction of the probe 104. As a result, while looking at the portion necessary for measurement on the workpiece W actually, a design value of its portion can be checked and a measurer can save an effort to remember the design value. Then, the measurer can move the probe 104 freely and make measurements continuously. In other words, natural measurement operation, in which the probe 104 is moved in a position distant from the workpiece W in order to check measurement progress in the whole workpiece W, a series of measurements including moving the probe 104 near to a measurement schedule position and then moving the probe 104 in right and left directions are made, and then the probe 104 is moved again in a position distant from the workpiece W in order to check measurement progress in the whole workpiece W, can be performed, and optimum measurement information according to its measurement operation can be provided.

Figure 10:
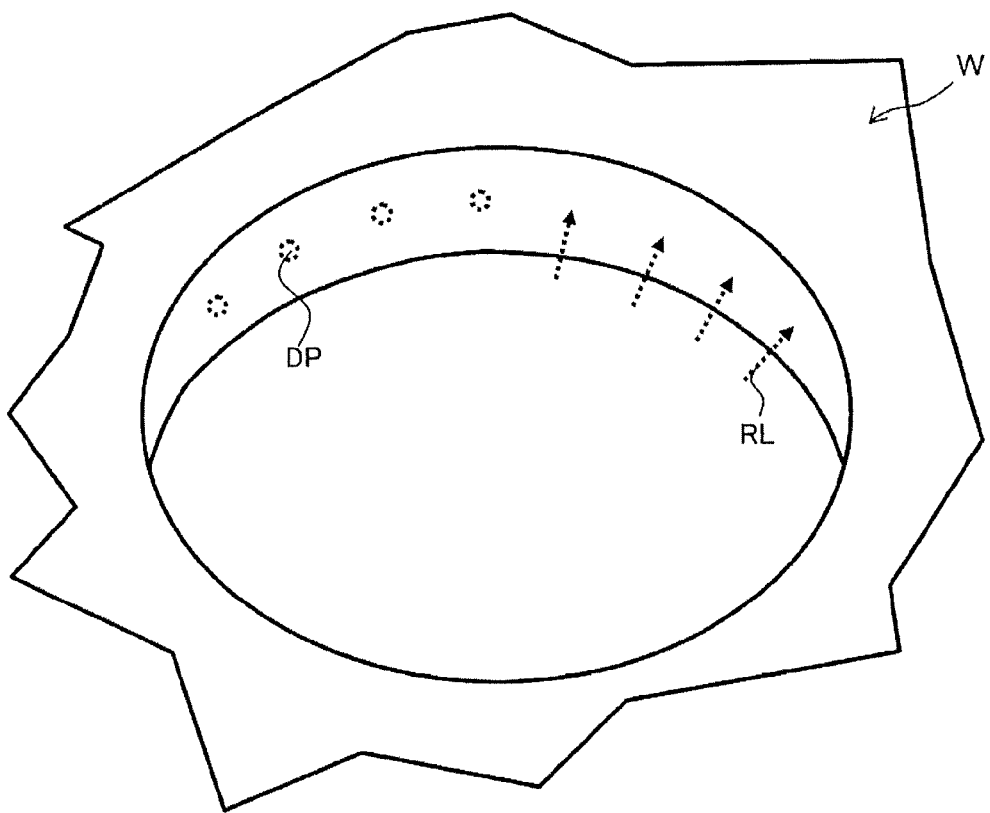
FIG. 10 is a schematic diagram showing one example of display information for identifying a measurement schedule position and a measured position in another workpiece.

Also, in the embodiment, in the case of wanting to measure the inside of a hole at equal distances in, for example, workpiece W as shown in FIG. 10, the projector 122 performs the display described above and thereby, a measured position, a measurement schedule position, etc. are not determined with measurer's eyes. In other words, the embodiment can avoid a situation in which measurer's action of looking at information displayed on the display module 138 and returning the eye to the workpiece W loses continuity of measurement and a situation in which measurement made depending on only measurer's remembrance causes deviation from the measurement schedule position. That is, according to the embodiment, in the case of previously deciding all the measurement schedule positions, measurement in the measurement schedule position can be made more accurately by projecting dashed arrows RL so as to guide the measurement schedule position as shown in FIG. 10. At the same time, by displaying a measured position DP on the workpiece W, the next measurement schedule position can easily be estimated even in the case of no display for identifying the measurement schedule position.

Also, in the embodiment, display information includes information about a measured position by the probe 104 and is configured to vary before and after measurement of the workpiece W. As a result, it can easily be determined whether or not measurement of a measurement schedule position is completed by the information about the measured position, and the measurement of the measurement schedule position can be advanced efficiently. In addition, the embodiment is not limited to this, and the display information may only vary before and after measurement of the workpiece W. Even in that case, the completion of measurement of the measurement schedule position can be recognized and proper measurement efficiency can be obtained. Or, the display information does not vary before and after measurement of the workpiece W, and may include only the measurement schedule position of the workpiece W. Even in that case, when the number of measurement schedule positions is small, there is no fear of confusion due to the presence or absence of the completion of measurement, and a decrease in workpiece efficiency can be avoided.

Also, in the embodiment, display information includes a design value of a measurement schedule position and a measured value of a measured position by the probe 104. As a result, a direct comparison between the design value and the measured value can be made, and the workpiece W can also be evaluated previously even during measurement. At the same time, a measurement result of a desired check portion on the workpiece W can be checked while holding the grip 119 of the multi-axis type three-dimensional measuring machine 102 without separately operating a personal computer. In a manner, the measurement result can be checked intuitively and speedily since the measurement result is projected on the desired check portion on the workpiece W by moving the probe 104 and adjusting a direction of the probe 104 while holding the grip 119.

That is, in the embodiment, highly-efficient and accurate measurement can be made without stopping measurement by being constructed so that a measurer can check information to be checked for measurement without removing a gaze from the workpiece W.

Figure 12:
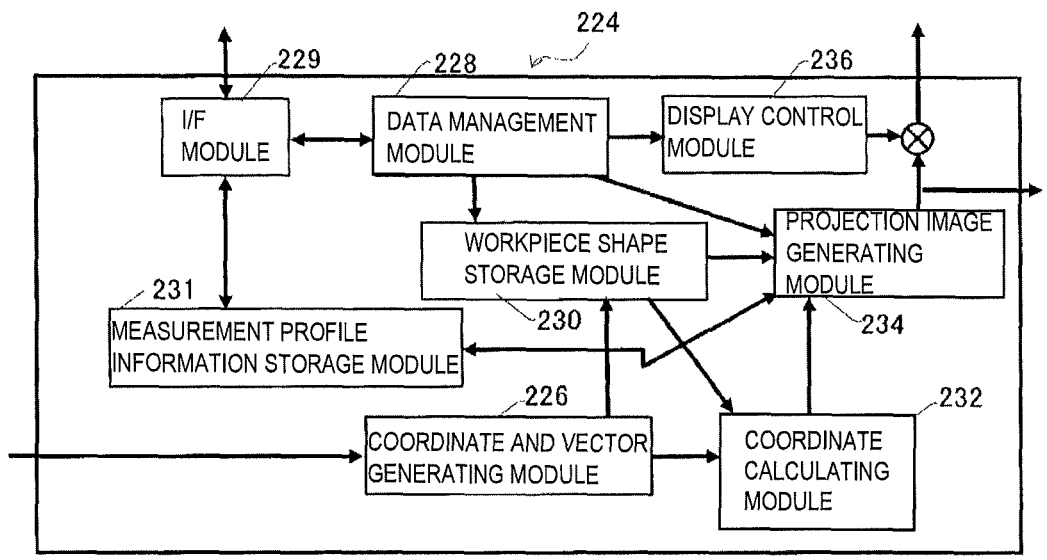
FIG. 12 is a schematic diagram showing one example of a processing module of a multi-axis type three-dimensional measuring apparatus according to a second embodiment of the invention.
Figure 13:
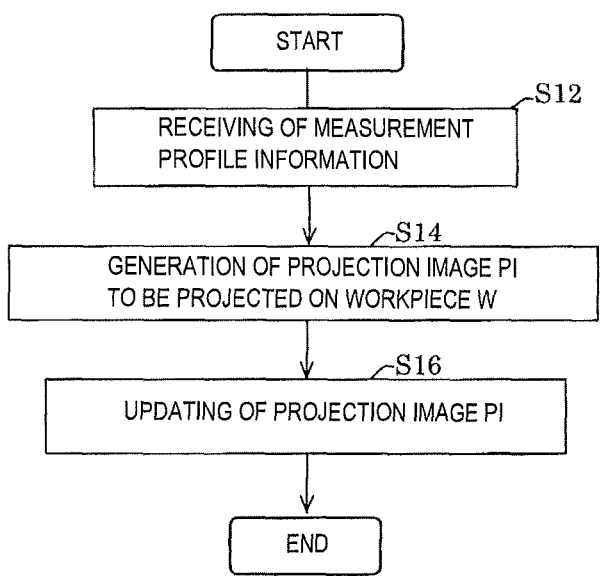
FIG. 13 is a flowchart showing one example of a display procedure of measurement profile information in a projection image.

Next, a second embodiment according to the invention will be described using FIGS. 12 and 13. FIG. 12 is a schematic diagram showing one example of a processing module of a multi-axis type three-dimensional measuring apparatus according to the second embodiment of the invention. FIG. 13 is a flowchart showing one example of a display procedure of measurement profile information in a projection image. In addition, in the second embodiment, configurations (a multi-axis type three-dimensional measuring machine and a display module) having the same function as that of the first embodiment are not shown and also, detailed description is omitted by assigning the same numerals to the last two digits.

A processing module 224 of a multi-axis type three-dimensional measuring apparatus 200 according to the present embodiment includes a coordinate and vector generating module 226, a data management module 228, a workpiece shape storage module 230, a coordinate calculating module 232, a projection image generating module 234, and a display control module 236 as shown in FIG. 12. The processing module 224 further includes an I/F module 229, and a measurement profile information storage module 231. The I/F module 229 and the measurement profile information storage module 231 will hereinafter be described.

The I/F module 229 can make connection communicably to the same kind of multi-axis type three-dimensional measuring apparatus arranged in a remote place etc. or a storage device etc. (collectively called an external measuring device etc.) for storing measurement profile information by the same kind of multi-axis type three-dimensional measuring apparatus. In addition, the I/F module 229 is connected to the data management module 228, and the communication is controlled by the data management module 228.

The measurement profile information storage module 231 is connected to the I/F module 229, and stores measurement profile information generated by the external measuring device etc. through the I/F module 229. Also, the measurement profile information storage module 231 is connected to the projection image generating module 234, and outputs the measurement profile information generated by the external measuring device etc. as display information to the projection image generating module 234. At the same time, the measurement profile information storage module 231 stores measurement profile information generated by this multi-axis type three-dimensional measuring apparatus 200.

Here, the measurement profile information includes information about a measurement procedure, a measurement instruction, a measurement technique, etc. in the case where a measurer measures workpiece W with the same shape using a multi-axis type three-dimensional measuring apparatus with the same kind as the multi-axis type three-dimensional measuring apparatus 200 (in other words, the measurement profile information includes information about a measurement procedure, a measurement instruction, a measurement technique, etc. in the case of previously measuring workpiece with the same shape as that of workpiece W targeted for this measurement). Further, the measurement profile information includes a part or all of sound information, character information, a still image, a moving image or information for reproducing a measurement result in the same manner as the time of measurement. In addition, in the embodiment, the measurement profile information storage module 231 may collectively or sequentially receive the measurement profile information from the external measuring device etc. through the I/F module 229, or may read and store a medium in which the measurement profile information is stored before measurement of workpiece W.

Next, one example of a display procedure of measurement profile information will be briefly described according to FIG. 13.

First, the processing module 224 receives measurement profile information (step S12). In other words, the measurement profile information generated by the external measuring device etc. is stored in the measurement profile information storage module 231 through the I/F module 229. Next, its measurement profile information is outputted from the measurement profile information storage module 231 as display information. Then, the processing module 224 generates a projection image PI in which the display information and projection graphics to be projected on workpiece W are synthesized (step S14). Then, the processing module 224 projects the generated projection image PI from a projector (not shown) and updates the projection image PI (step S16). According to this projection image PI, this measurer can make measurement while referring to the measurement profile information or following the measurement profile information.

For example, the case of prototyping a door (workpiece W) of a vehicle for a new product in a first factory (or a prototype workplace etc.) and producing and inspecting its door in a second factory (a mass-production factory etc.) different from the first factory is assumed. In that case, the second factory has a technician (corresponding to this measurer) skilled in measurement, but information such as the information about what part of the door is inspected precisely or how measurement is made, is normally transmitted from the first factory by paper of only documents or drawings since a measurement target is the new product. When a procedure of measurement etc. are shot by a video in the first factory and information about the procedure of measurement is transmitted to the second factory as moving image information and is simply shown to a technician before measurement, the technician must remember its video and measure the door in the case of making measurement actually. In other words, the door is measured based on a sense of the technician in the second factory, and there is a possibility that a measurement result to be obtained cannot be obtained in the second factory. In order to avoid such a situation, it also becomes necessary to conduct on-the-job training in which a technician (corresponding to the previous measurer) of the first factory visits the second factory to provide education or in reverse, the technician of the second factory is brought in the first factory to conduct training.

On the other hand, according to the embodiment, measurement made by the previous measurer skilled in a remote place can be reproduced on the workpiece W by the projector as if this measurer made measurement. In other words, this measurer can follow that to make measurement and thereby, the workpiece W can be measured with high accuracy and high efficiency while eliminating the need for on-the-job training. In addition, it is assumed that this measurer differs from the previous measurer, but this measurer may be the same person as the previous measurer.

The invention has been described by giving the embodiments described above, but the invention is not limited to the embodiments described above. That is, it goes without saying that improvements and design changes can be made without departing from the gist of the invention.

For example, in the first embodiment, the projector 122 is integrated with the arm head 118 and the projection direction of the projection image PI is set in the same direction as the direction of the distal end of the probe 104, but the invention is not limited to this. For example, it may be constructed so that the projector is rotatably supported in the arm head and even when the direction of the distal end of the probe is not turned to the workpiece W, the projection direction of the projection image PI is automatically turned to the workpiece W and full-scale projection graphics of the workpiece W can be projected always. In that case, a measurer can always check display information on the workpiece W regardless of the direction of the directional vector.

Also, in the first embodiment, the probe 104 is the ball probe as shown in FIG. 2B, but the invention is not limited to this ball probe. For example, the probe may be a contact type probe such as a touch signal probe. Or, the probe may be, for example, a non-contact type probe using a line laser etc.

Also, in the first embodiment, the full-scale projection graphics of the workpiece W is projected so as to match with the workpiece W, but the invention is not limited to this. For example, by an output of the data management module, only display information may be projected as the projection image PI without projecting the full-scale projection graphics of the workpiece W on the workpiece W. This is because it may be easier to grasp a shape etc. of the workpiece W and make measurement in the absence of the full-scale projection graphics of the workpiece W, depending on a situation of a shape, a color, etc. of the workpiece W.

Also, the embodiments described above are configured to include information about a measurement schedule position and information about a measured position as display information, but the invention is not limited to this. For example, the display information may include, for example, measurement conditions (for example, measurement traps or a measurement procedure in consideration of a shape, a material, etc. of the workpiece W), character information such as error information or results of decision to pass or fail, statistical information (characters and graphs) such as a control chart or a process capability chart. In that case, a measurement result with higher reliability can be obtained.

The invention can be widely applied to a multi-axis type three-dimensional measuring apparatus having a probe for measuring workpiece, and a multi-axis arm mechanism including the probe in the distal end.

What is claimed is:

1. A multi-axis type three-dimensional measuring apparatus comprising:
    a multi-axis arm mechanism;
    a probe formed in a distal end of the multi-axis arm mechanism and configured to measure a workpiece; and
    a projector formed in the distal end of the multi-axis arm mechanism and configured to scale a range of a projected projection image according to a distance between the workpiece and the probe, wherein
    the projector is configured to project full-scale projection graphics of said workpiece so as to match the full-scale projection graphics with the workpiece regardless of a difference in a distance between the workpiece and the probe, and to project display information identifying a measurement schedule position by the probe.

2. The multi-axis type three-dimensional measuring apparatus as claimed in claim 1, wherein a projection direction of the projection image is set in the same direction as a direction of a distal end of the probe.

3. The multi-axis type three-dimensional measuring apparatus as claimed in claim 2, wherein the display information is configured to vary before and after measurement of the workpiece.

4. The multi-axis type three-dimensional measuring apparatus as claimed in claim 3, wherein the display information further includes information about a measured position by the probe.

5. The multi-axis type three-dimensional measuring apparatus as claimed in claim 4, wherein the display information further includes a design value of the measurement schedule position and a measured value of a measured position by the probe.

6. The multi-axis type three-dimensional measuring apparatus as claimed in claim 5, wherein the display information further includes measurement profile information about a measurement procedure, a measurement instruction and a measurement technique in the case of measuring workpiece with the same shape as that of the workpiece.

7. The multi-axis type three-dimensional measuring apparatus as claimed in claim 1, wherein the display information is configured to vary before and after measurement of the workpiece.

8. The multi-axis type three-dimensional measuring apparatus as claimed in claim 7, wherein the display information further includes information about a measured position by the probe.

9. The multi-axis type three-dimensional measuring apparatus as claimed in claim 8, wherein the display information further includes a design value of the measurement schedule position and a measured value of a measured position by the probe.

10. The multi-axis type three-dimensional measuring apparatus as claimed in claim 9, wherein the display information further includes measurement profile information about a measurement procedure, a measurement instruction and a measurement technique in the case of measuring workpiece with the same shape as that of the workpiece.

11. The multi-axis type three-dimensional measuring apparatus as claimed in claim 1, wherein the display information further includes information about a measured position by the probe.

12. The multi-axis type three-dimensional measuring apparatus as claimed in claim 11, wherein the display information further includes a design value of the measurement schedule position and a measured value of a measured position by the probe.

13. The multi-axis type three-dimensional measuring apparatus as claimed in claim 12, wherein the display information further includes measurement profile information about a measurement procedure, a measurement instruction and a measurement technique in the case of measuring workpiece with the same shape as that of the workpiece.

14. The multi-axis type three-dimensional measuring apparatus as claimed in claim 1, wherein the display information further includes a design value of the measurement schedule position and a measured value of a measured position by the probe.

15. The multi-axis type three-dimensional measuring apparatus as claimed in claim 14, wherein the display information further includes measurement profile information about a measurement procedure, a measurement instruction and a measurement technique in the case of measuring workpiece with the same shape as that of the workpiece.

16. The multi-axis type three-dimensional measuring apparatus as claimed in claim 1, wherein the display information further includes measurement profile information about a measurement procedure, a measurement instruction and a measurement technique in the case of measuring workpiece with the same shape as that of the workpiece.

* * * * *